3,300,477
ISOLATION OF 5'-GUANYLIC ACID BY FORMATION OF 5'-GUANYLIC ACID DIOXANATE
Thedore A. Jacob, Westfield, Ronald A. Vitali, Ridgefield, and John W. Rothrock, Watchung, N.J., and Edward S. Inamine, Pleasant Hill, Calif., assignors to Merck & Co., Inc., Rahway, N.J., a corporation of New Jersey
No Drawing. Filed June 11, 1964, Ser. No. 374,253
7 Claims. (Cl. 260—211.5)

This invention is concerned with a method for the isolation and recovery of 5'-guanylic acid. More particularly, it is concerned with an improved method for isolating 5'-guanylic acid from aqueous solutions in crystalline form.

5'-guanylic acid, which is also known as guanosine-5'-monophosphate, and its salts are valuable flavoring agents for foods, beverages and seasonings. The addition of small amounts of this guanylic acid or its salts greatly enhances the taste of various foods, beverages and seasonings.

Since 5'-guanylic acid is difficult to recover in crystalline form, the isolation and recovery of this product from various sources, such as fermentation broths and enzymatic ribonucleic acid hydrolysates, has been carried out using expensive and elaborate separation and purification techniques. In addition, the problem of recovering guanylic acid from ribonucleic acid hydrolysates is complicated by the presence of other 5'-nucleotides which are difficult to separate from the 5'-guanylic acid.

It is an object of this invention to provide a method of recovering 5'-guanylic acid in crystalline form from aqueous solutions of this product. A further object is to provide a method for the isolation of 5'-guanylic acid from enzymatic ribonucleic acid hydrolysates and from fermentation sources. Still another object of this invention is to provide a new crystalline 5'-guanylic acid solvate. Other objects of the invention will be apparent from the detailed description of this invention hereinafter provided.

In accordance with this invention, it is now found that 5'-guanylic acid crystallizes in the form of a dioxanate solvate from acidic aqueous solutions containing 1,4-dioxane. This crystalline solvate, hereinafter referred to as the 1,4-dioxanate, is substantially insoluble in water and can therefore be readily separated and recovered from the aqueous solution. Thus, this new crystalline product provides a convenient means for recovering 5'-guanylic acid from solutions of this acid containing other water soluble substances, for example, ribonucleic acid hydrolysates, fermentation sources, and the like.

The crystalline dioxanate is formed by adding 1,4-dioxane to an acidic solution of the 5'-guanylic acid having a pH between about 0.5 and 5.0. Generally, it is preferred to precipitate the product from solutions having a pH between about 1.0 and 3.0, since under optimum conditions maximum yields of the crystalline dioxanate are obtained at this pH range.

The concentration of the 5'-guanylic acid in the aqueous solution is not critical and it has been found that the product can be precipitated from solutions containing as little as about 0.2%. However, this will depend in part upon the presence and nature of other substances present in addition to the 5'-guanylic acid. Generally, it is preferred to effect the precipitation from solutions containing between about 1 and 5% of 5'-guanylic acid since under these conditions maximum amounts of the 5'-guanylic acid are recovered in the form of the crystalline dioxanate.

Generally, the quantity of 1,4-dioxane required to produce a maximum yield of 5'-guanylic acid dioxanate is much more than the theoretical amount of one mole of 1,4-dioxane per mole of 5'-guanylic acid. Experimentally, it has been found that under optimum conditions, about 16.0 times the theoretical amount of 1,4-dioxane is required for maximum yields of the 1,4-dioxanate. Combinations of 1,4-dioxane and other dioxane miscible solvents such as methanol can also be used to provide excellent yields of 1,4-dioxanate.

The 5'-guanylic acid dioxanate obtained in accordance with the procedures herein described exists as a solvate consisting of 1 mole of 5'-guanylic acid, 1 mole of water and 1 mole of 1,4-dioxane. The product is actually a stable solvate which must be heated at 100° C. under reduced pressure for a considerable length of time before the solvate is broken.

The 5'-guanylic acid dioxanate is readily converted to a salt of 5'-guanylic acid by dissolving the dioxanate in water, neutralizing the solution with alkali, adding a water miscible solvent in which the salt is insoluble to the solution and recovering the precipitated alkali salt. In particular, the sodium salt of 5'-guanylic acid can be prepared by using sodium hydroxide to neutralize the aqueous 5'-guanylic acid dioxanate solution and ethanol to precipitate the sodium salt. Commercially, the 5'-guanylic acid can be utilized more readily as a salt than as the free acid.

In a particular embodiment of this invention, 5'-guanylic acid can be recovered from solutions of guanine and guanosine, because neither guanine nor guanosine forms a crystalline dioxanate upon the addition of 1,4-dioxane to the solution.

Also, although the physical and chemical properties of 5'-guanylic acid and its salts are quite similar to phosphoric acid, nevertheless, the 1,4-dioxanate can be precipitated from an aqueous phosphoric acid solution containing 5'-guanylic acid upon the addition of 1,4-dioxane to the phosphoric acid solution.

In accordance with a further embodiment of this invention, it is also found that 5'-guanylic acid can be recovered from ribonucleic acid hydrolysates which contain other 5'-nucleotides such as adenylic acid, cytidylic acid, and uridylic acid. None of the other 5'-nucleotides form crystalline solvates with 1,4-dioxane and it is therefore possible to separate the 5'-guanylic acid from aqueous solutions containing these other 5'-nucleotides as well as 5'-guanylic acid. Similarly, the process of the present invention is useful for recovering 5'-guanylic acid from aqueous solutions derived from fermentation broths.

The following examples illustrate the properties and preparation of 5'-guanylic acid as the 1,4-dioxanate and various methods of isolating the same from different kinds of solutions and broths. They are intended to illustrate and not limit the invention.

*Example 1.—Crystallization of 5'-guanylic acid dioxanate*

To a solution of 2 grams of disodium 5'-guanylate in 25 ml. of water is added about 10 ml. of a sulfonic acid ion exchange resin on the hydrogen cycle with stirring. The resulting slurry is filtered and the precipitate washed with a small amount of water to yield 27 ml. of an aqueous solution of 5'-guanylic acid having a pH of about 1.7. One ml. of this solution is then mixed with 1 ml. of 1,4-dioxane. After standing for a short time, a crystalline product precipitates and is recovered by filtration. A sample of this crystalline solvate is found to have the following chemical and physical characteristics:

Empirical formula: Guanosine - 5' - monophosphate·
1.0$H_2O$-1.0 dioxane ($C_{14}H_{24}N_5O_{11}P$)
Molecular weight: 469.10

Equivalent weight (titration): 460; $pK_1$=2.6, E.w.=458; $pK_2$=6.3

Karl Fisher ($H_2O$): 3.9%

$E^{1\%}_{1cm.}$ (252 m$\mu$): 293

NMR: Indicates 1 mole of dioxane

X-ray: Crystalline (slurry).

*Example 2.—Isolation and crystallization of 5'-guanylic acid dioxanate from fermentation broths*

Fermentation filtrate obtained as described below is charged to a column of a strong base anion exchange resin and the column washed with water and dilute acid to remove any guanine or guanosine that may have absorbed. The 5'-guanylic acid is eluted from the column with aqueous 0.3 M to 0.6 M phosphoric acid. The eluate is vacuum concentrated to a guanosine-5'-monophosphate concentration of about 20 mg./ml. An equal volume of 1,4-dioxane is added to this concentrate, whereupon 5'-guanylic acid dioxanate crystallizes from solution. The crystals are recovered by filtration, washed and vacuum dried.

To prepare the fermentation broth for initial absorption on the column, 650 ml. of fermentation broth containing about 650 mg. of 5'-guanylic acid is acidified to pH 3.0 with a sulfonic acid ion exchange resin on the hydrogen cycle. The slurry is filtered and the filtrate brought to pH 8.0 with magnesium oxide and then to pH 9.5 with ammonium hydroxide. The precipitate which forms is removed by filtration. The filtrate is then treated as described above.

*Example 3.—Isolation and crystallization of 5'-guanylic acid dioxanate from dialyzed fermentation broths*

Whole fermentation broth containing 5'-guanylic acid is dialyzed overnight by rotating a cellulose dialysis bag containing the broth in a 4 liter beaker of water. The dialysate is then concentrated and filtered. A sulfonic acid ion exchange resin on the hydrogen cycle (Amberlite IR–120) is added batchwise until a pH of approximately 2.1 is obtained and then the resin is filtered off. The filtrate is concentrated and the phosphoric acid added until a pH of approximately 1.5 is obtained. An equal volume of 1,4-dioxane is added to crystallize 5'-guanylic acid dioxanate.

The 5'-guanylic acid dioxanate is identified by paper chromatography and biological activity. It assays 96% pure by U.V. absorption and 100% pure by bioassay.

*Example 4.—Isolation and crystallization of 5'-guanylic acid dioxanate from ribonucleic acid hydrolysates*

Purified ribonnucleic acid (RNA) is hydrolyzed with a crude enzyme preparation and the resulting 5'-nucleotides are separated from the enzymes by either dialysis or by chromatography on a dextran polymer (Sephadex) column. The solution containing the nucleotides is vacuum concentrated to a small volume and its pH adjusted to approximately 3.0 with a cationic resin. The pH of the resin-free solution is further reduced to 1.0–2.0 with phosphoric acid. Two volumes of 1,4-dioxane are added resulting in the precipitation of 5'-guanylic acid dioxanate.

*Example 5.—Crystallization of 5'-guanylic acid dioxanate from a mixture of guanosine-5'-monophosphate, guanosine and guanine*

To a solution of 4.0 ml. of 0.5 M $H_3PO_4$ containing 60 mg. of guanosine-5'-monophosphate, 9.0 mg. of guanosine and 2.0 mg. of guanine is added 8.0 ml. of 1,4-dioxane with stirring. The crystalline precipitate which forms is filtered, washed with aqueous dioxane and methanol and dried.

A paper chromatogram of the crystalline product in an isobutyric acid-ammonia-water system (Pabst No. 4) shows the presence only of guanosine-5'-monophosphate. A similar chromatogram of the crystallization mother liquors shows the presence of guanosine-5'-monophosphate, guanosine and guanine.

*Example 6.—Isolation and crystallization of 5'-guanylic acid dioxanate from phosphoric acid solutions*

A 100 ml. solution of 0.3 M phosphoric acid containing 500 mg. of 5'-guanylic acid is concentrated in vacuo at 25° C. to a syrupy state. The concentrated solution is extracted with an 80% diethyl ether:20% ethanol solution and the resulting residue is taken up in a small volume of 0.3 M phosphoric acid. Two volumes of 1,4-dioxane are then added and the crystalline 5'-guanylic acid dioxanate which precipitates is isolated by filtration.

*Example 7.—Conversion of 5'-guanylic acid dioxanate to its salts*

Three grams of 5'-guanylic acid dioxanate is dissolved in 50 ml. of warm water. The solution is neutralized to pH 8.0 with 6 N NaOH, and then 25 ml. of ethanol is added. Upon standing for approximately 2 hours at room temperature, a crystalline product precipitates. The precipitated product is filtered, washed with 50% ethanol and acetone and dried under vacuum at room temperature.

A Karl Fisher analysis of the product gives 8.17% water. The theoretical amount of water for guanosine-5'-monophosphate.2Na.2$H_2O$ is 8.13%.

Any departure from the above description which conforms to the present invention is intended to be included within the scope of the claims.

What is claimed is:

1. A crystalline compound which consists of one mole of 5'-guanylic acid, one mole of water and one mole of 1,4-dioxane.

2. A process which comprises reacting 1,4-dioxane with an aqueous acidic solution containing 5'-guanylic acid to produce a crystalline 5'-guanylic acid dioxanate.

3. A process which comprises reacting 1,4-dioxane with an aqueous solution containing 5'-guanylic acid having a pH of about 0.5 to 5, and recovering the precipitated crystalline 5'-guanylic acid dioxanate.

4. A process which comprises reacting 1,4-dioxane with an aqueous solution containing 5'-guanylic acid and other nucleotides at a pH of about 0.5 to 5.0 and recovering the precipitated, crystalline 5'-guanylic acid dioxanate.

5. A process which comprises reacting 1,4-dioxane with dialyzed fermentation broths containing 5'-guanylic acid and having a pH of about 0.5 to 5.0 and recovering the precipitated 5'-guanylic acid dioxanate.

6. A process for recovering 5'-guanylic acid for enzymatic ribonucleic acid hydrolysates containing 5'-guanylic acid which comprises acidifying said hydrolysates to a pH of about 0.5 to 5, reacting said acidified solution with 1,4-dioxane and recovering the precipitated, crystalline 5'-guanylic acid dioxanate.

7. A process which comprises reacting phosphoric acid solutions containing 5'-guanylic acid with 1,4-dioxane and recovering the precipitated crystalline 5'-guanylic acid dioxanate.

References Cited by the Examiner

UNITED STATES PATENTS

| | | | |
|---|---|---|---|
| 3,190,877 | 6/1965 | Ishibashi et al. | 260—211.5 |
| 3,201,389 | 8/1965 | Fujimoto et al. | 260—211.5 |

FOREIGN PATENTS 675,390  12/1963  Canada.

LEWIS GOTTS, *Primary Examiner.*

JOHNIE R. BROWN, *Assistant Examiner.*